United States Patent
Mours et al.

(10) Patent No.: US 6,756,475 B2
(45) Date of Patent: Jun. 29, 2004

(54) PREPARATION OF POLYOXYMETHYLENES

(75) Inventors: Marian Mours, Weisenheim (DE); Rainer Anderlik, Heidelberg (DE); Gitta Egbers, Ludwigshafen (DE); Michael Kirschey, Hanau-Grossauheim (DE); Martin Roos, Hanau-Grossauheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 2 days.

(21) Appl. No.: 10/203,285

(22) PCT Filed: Feb. 2, 2001

(86) PCT No.: PCT/EP01/01135

§ 371 (c)(1), (2), (4) Date: Aug. 2, 2002

(87) PCT Pub. No.: WO01/58974

PCT Pub. Date: Aug. 16, 2001

(65) Prior Publication Data

US 2003/0018104 A1 Jan. 23, 2003

(30) Foreign Application Priority Data

Feb. 10, 2000 (DE) .......................................... 100 06 037

(51) Int. Cl.⁷ ............................................... C08G 65/34

(52) U.S. Cl. ........................ 528/425; 528/230; 528/270; 528/480; 528/502; 528/503; 528/232

(58) Field of Search ................................. 528/425, 232, 528/230, 270, 480, 502, 503

(56) References Cited

U.S. PATENT DOCUMENTS

| | | | |
|---|---|---|---|
| 3,442,866 A | 5/1969 | Seddon | |
| 4,339,569 A | 7/1982 | Sugio et al. | |
| 4,431,794 A | 2/1984 | Sadlowski | |
| 4,850,835 A | 7/1989 | Rudolph | |
| 5,288,840 A | 2/1994 | Morishita | |
| 5,576,823 A | 11/1996 | Kakuta | |
| 5,587,449 A | 12/1996 | Fleischer | |

FOREIGN PATENT DOCUMENTS

GB 974819 11/1964

*Primary Examiner*—Duc Truong
(74) *Attorney, Agent, or Firm*—Keil & Weinkauf

(57) ABSTRACT

Continuous process for preparing polyoxymethylene homo- or copolymers by bulk polymerization of the monomers in the presence of cationic initiators, and also, if desired, in the presence of regulators, where during the polymerization both the monomers and the polymer are present in molten form and, if desired, the polymer is then deactivated, and the melt is discharged, cooled and pelletized, which comprises discharging, cooling and pelletizing the polymer at an elevated pressure and in the presence of a liquid.

13 Claims, No Drawings

PREPARATION OF POLYOXYMETHYLENES

The invention relates to an improved continuous process for preparing polyoxymethylenes.

It is known that oxymethylene polymers can be prepared by continuous bulk polymerization of the monomers in the presence of cationic initiators. This polymerization is frequently carried out in kneaders or in extruders. The temperature profile here can be such that the resultant oxymethylene polymer is produced either in solid form (DE-A 1 161 421, DE-A 1 495 228, DE-A 1 720 358, DE-A 3 018 898), or else as a melt (DE-A 3 147 309). The work-up of the polymer produced in solid form is known, and for this see: DE-A 3147309, DE-A 3628561, EP-A 678535, EP-A 699965 and DE-A 4423617.

The polymer produced as a melt is further processed in a downstream devolatilizing and finishing reactor. For this, the melt is conveyed directly from the extruder to this reactor without undergoing any phase change between these stages of the process (DE-A 3 147 309). In this downstream reactor, the thermal degradation of the unstable chain ends of the polymer takes place. The removal of the unconverted monomers and of the decomposition products arising during the thermal degradation, in particular formaldehyde, takes place by evaporation, mostly in vented extruders.

Since the monomers used are generally not completely converted to the polymer, their vapor pressure has a foaming effect on the polymer melt as soon as the pressure on the melt is reduced to atmospheric pressure (see DE-A 3 147 309).

It is an object of the present invention, therefore, to provide an improved continuous process for preparing polyoxymethylenes which has the following advantages over the prior art:

The tendency to form a foam during devolatilization should be reduced, and the production of fines during pelletization minimized. The pellets should be compact. The throughputs in the finishing extruder should be increased and the energy requirement lowered.

We have found that this object is achieved by means of a continuous process for preparing polyoxymethylene homo- or copolymers by bulk polymerization of the monomers in the presence of cationic initiators, and also, if desired, in the presence of regulators, where during the polymerization both the monomers and the polymer are present in molten form and, if desired, the polymer is then deactivated, and the melt is discharged, cooled and pelletized, which comprises discharging, cooling and pelletizing the polymer at an elevated pressure and in the presence of a liquid.

The process may in principle be carried out on any screw machinery with high mixing effectiveness. Preferred devices are extruders, Buss kneaders and flow tubes with or without static mixing elements, preferably twin-screw extruders.

In a first step of the novel process, polyoxymethylene homo- or copolymer is melted in a preferably heated zone.

Polymers of this type are known to the skilled worker and are described in the literature.

These polymers very generally have at least 50 mol % of repeat —$CH_2O$— units in their main polymer chain.

The homopolymers are generally prepared by polymerizing formaldehyde or trioxane, preferably in the presence of suitable catalysts.

For the purposes of the present invention, polyoxymethylene copolymers are preferred, particularly those which, besides the —$CH_2O$— repeat units, also have up to 50 mol %, preferably from 0.1 to 20 mol %, in particular from 0.3 to 10 mol %, and very particularly preferably from 2 to 6 mol %, of repeat units

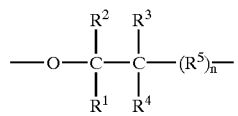

where $R^1$ to $R^4$, independently of one another, are hydrogen, $C_1$–$C_4$-alkyl or halogen-substituted alkyl having from 1 to 4 carbon atoms, and $R^5$ is —$CH_2$—, —$CH_2O$—, $C_1$–$C_4$-alkyl- or $C_1$–$C_4$-haloalkyl-substituted methylene or a corresponding oxymethylene group, and n is from 0 to 3. These groups may be advantageously introduced into the copolymers by ring-opening of cyclic ethers. Preferred cyclic ethers have the formula

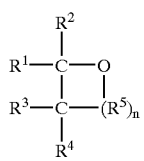

where $R^1$ to $R^5$ and n are as defined above. Mention may be made, merely as examples, of ethylene oxide, propylene 1,2-oxide, butylene 1,2-oxide, butylene 1,3-oxide, 1,3-dioxane, 1,3-dioxolane and 1,3-dioxepan as cyclic ethers, and also linear oligo- and polyformals, such as polydioxolane or polydioxepan, as comonomers.

Other suitable oxymethylene terpolymers are those prepared, for example, by reacting trioxane, one of the cyclic ethers described above and a third monomer, preferably bifunctional compounds of the formula

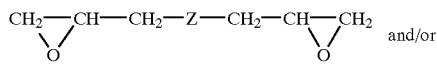

and/or

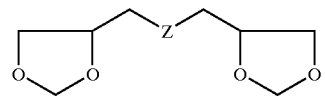

where Z is a chemical bond, —O— or —ORO— (R=$C_1$–$C_8$-alkylene or $C_2$–$C_8$-cycloalkylene).

Preferred monomers of this type are ethylene diglycide, diglycidyl ether and diethers made from glycidyl compounds and formaldehyde, dioxane or trioxane in a molar ratio of 2:1, and also diethers made from 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol or 1,4-cyclohexanediol, to mention merely a few examples.

Processes for preparing the homo- and copolymers described above are known to the person skilled in the art and are described in the literature, and further details would therefore be superfluous here.

The preferred polyoxymethylene copolymers have melting points of at least 150° C. and molecular weights (weight average) $M_w$ of from 5000 to 200,000, preferably from 7000 to 150,000.

Particular preference is given to end-group-stabilized polyoxymethylene polymers which have C—C bonds at the ends of the chains.

The molten polymer causes what is known as melt sealing in the polymerization which follows, so that volatile constituents remain in the extruder, for example. The above-mentioned monomers or a mixture of these, together or in succession with cationic initiators, are fed into the polymer melt. The temperature of the reaction mixture during the feed is preferably from 62 to 114° C., in particular from 70 to 90° C.

The novel process is preferably employed for the homo- or copolymerization of trioxane. However, in principle any of the monomers described above, including tetroxane, for example, may be used as monomer.

The monomers, for example trioxane, are preferably fed molten and generally at from 60 to 120° C. Since the polymerization is generally exothermic, it is merely necessary to melt the polymer by supplying energy at the start of the novel process. The heat of polymerization generated is then sufficient to melt the polyoxymethylene homo- or copolymer formed.

The molecular weights of the polymer may, if desired, be adjusted to the desired values by using the customary (trioxane) polymerization regulators. Possible regulators are acetals and, respectively, formals of monohydric alcohols, the alcohols themselves, and also the small amounts of water whose presence can generally never be completely avoided and which function as a chain transfer agent. The amounts used of the regulators are from 10 to 10,000 ppm, preferably from 100 to 1000 ppm.

The initiators used are the customary cationic (trioxane) polymerization initiators. Suitable initiators are protonic acids, such as fluorinated or chlorinated alkyl- or arylsulfonic acids, e.g. trifluoromethanesulfonic acid, or Lewis acids, such as tin tetrachloride, arsenic pentafluoride, phosphorus pentafluoride and boron trifluoride, or else their complex compounds and salt-type compounds, e.g. boron trifluoride etherates and triphenylmethyl hexafluorophosphate. The amounts used of the catalysts are from about 0.01 to 1000 ppm, preferably from 0.05 to 10 ppm. It is generally advisable to add the catalyst in dilute form, preferably at concentrations of from 0.005 to 5% by weight. Solvents which may be used for this purpose are inert compounds, such as aliphatic or cycloaliphatic hydrocarbons, halogenated aliphatic hydrocarbons, glycol ethers, etc.

Monomers, initiators and, if desired, regulators may be premixed in any desired manner, or else added separately from one another to the polymerization reactor. There may also be provision of comonomer feed points along the reactor.

According to the invention, the temperature and pressure in the polymerization zone are to be selected in such a way that monomers and polymer are molten. For example, trioxane melts at from about 60 to 65° C., and its boiling point at atmospheric pressure is 115° C. Since the polymerization temperatures are relatively high, the polymerization generally takes place at elevated pressure, preferably from 1.5 to 500 bar, in particular from 5 to 50 bar. Under the reaction conditions, trioxane is in equilibrium with from about 1.5 to 2% of formaldehyde, at least some of which is present as a gas in the closed system. The oxymethylene homopolymer has a melting point of about 176° C., and if relatively large amounts of comonomers have been incorporated the melting point can be lowered to about 150° C., and it can be still further reduced by unconverted trioxane. The temperature of the melt in the polymerization reactor should not exceed 300° C., since at high temperatures of this nature oxymethylene polymers decompose. The particularly preferred temperature range is from 150 to 200° C. The melt temperature of the monomer/polymer mixture is very difficult to measure precisely, but some indication is given by the external temperature of the polymerization reactor. It is important that the polymer is produced in molten form.

The residence time of the polymerization mixture in the polymerization zone is preferably from 0.1 to 20 min, in particular from 0.4 to 5 min. The polymerization is preferably conducted to a conversion of at least 30%, in particular more than 60%. Under favorable conditions it is also possible to achieve conversions of 80% and above.

It is preferable for the polymerization mixture to be deactivated immediately following the polymerization, without any phase change taking place.

The deactivation of the catalyst residues generally takes place by adding deactivators to the polymerization melt. Examples of suitable deactivators are ammonia, aliphatic or aromatic amines, alcohols, salts which react as bases, such as sodium carbonate or borax, or else water. The amounts of these added to the polymers are preferably up to 1% by weight.

The spatial separation of the deactivation reactor with respect to the polymerization reactor is such that the polymer/monomer melt can move without hindrance from one to the other but penetration of the deactivators into the polymerization reactor is reliably prevented. The separation is brought about by constrictions incorporated, which locally increase the flow rate of the melt, for example by melt flow restrictors if extruders are used. The design of the deactivation reactor is such that there is thorough mixing of the polymer/monomer melt within a short time. In the case of extruders this can be achieved in practice by incorporating particular kneading elements or back-mixing elements. The temperature in the deactivation reactor is preferably from 150 to 300° C. It is also possible for stabilizers to be added straightaway to the melt in the deactivation reactor, preferably together with the deactivators.

In another preferred embodiment of the novel process, it is also possible for the deactivation not to be carried out until the pressure-pelletization described below has taken place, for example by spraying material onto the crude POM pellets.

In the novel process the melt is discharged, cooled and pelletized, and it is important here that the polymer is discharged, cooled and pelletized at elevated pressure and in the presence of a liquid.

Examples of suitable equipment for what is known as pressure-pelletization are vertically arranged tubes with a static pressure (generated by the column of liquid) and tubes with cross-sectional constrictions, and for economic reasons (consumption of liquid) particular preference is given to a circular arrangement of the tubes.

The pressure in the discharge equipment (cutting chamber) essentially depends on the vapor pressure of the monomers used and should be above this vapor pressure at the temperature of discharge of the polymer melt.

The pressure in the cutting chamber is a function of the selection of the pipeline arranged between the cutting chamber and the centrifuge. The pressure drop in the pipeline system is essentially determined by the cross-sectional area, the length, the number and nature of bends in the-pipe, the cross-sectional changes and the flow rate. It is preferable for high pressures to be achieved by using long pipelines.

The pressure is generally from 1.2 to 200 bar, preferably from 2 to 50 bar. Particularly suitable liquids are those which have high heat capacity and are nontoxic, for example oils, such as paraffin oils, or heat-transfer oils, such as Dowtherm or Marlotherm.

Preferred liquid is water.

The temperature of the stream of liquid is generally from 20 to 95° C., in particular from 35 to 75° C. The stream of liquid cools the melt (without escape of the monomers). To remove the material from the discharge die, use may be made, for example, of rotating knives or of cutting rotors, preferably applied against the discharge die.

The liquid/pellet mixture is then separated using suitable equipment, such as centrifuges (rotating centrifuge basket) or cyclones or impact dryers.

The residence time in the liquid is preferably from 0.1 sec to 4 min, preferably from 0.55 sec to 2 min and in particular from 1 to 40 seconds.

It is advantageous for the liquid to be reintroduced into the circuit and for the pellets then to be dried, and also, if desired, subjected to a preliminary devolatilization.

For this use is made of suitable equipment, such as fluidized-bed dryers, hot-air dryers or vacuum dryers, or else combinations of these. Radiation dryers (infrared radiation or microwaves) are also known. During these processes energy is supplied to the pellets and serves to heat the pellets and to remove further amounts of residual liquid, and also unreacted monomer content.

The temperature of the pellets during this process is from 25 to 150° C., preferably from 65 to 120° C.

In one preferred embodiment of the novel process, the crude POM is subjected to preliminary devolatilization, increasing the throughput in the finishing extruder.

The novel procedure gives compact, almost spherical pellets, avoiding the production of fines and foaming, as in the prior art. The resultant polyoxymethylene polymer may then be further processed with customary additives, such as stabilizers, rubbers, fillers, etc., in a usual manner.

We claim:

1. A continuous process for preparing polyoxymethylene homo- or copolymers by bulk polymerization of the monomers in the presence of cationic initiators, and optionally in the presence of regulators, where during the polymerization both the monomers and the polymer are present in molten form, which process comprises discharging, cooling and pelletizing the melt at an elevated pressure and in the presence of a liquid.

2. A process as claimed in claim 1, which further comprises a step wherein the discharged, cooled and pelletized polymer is separated from the liquid.

3. A process as claimed in claim 1, wherein the pressure is from 1.2 to 200 bar.

4. A process as claimed in claim 1, wherein the liquid is composed of water or of oils or of a mixture of these.

5. A process as claimed in claim 1, wherein the polymer is deactivated in the melt and is subsequently discharged, cooled and pelletized in the presence of the liquid.

6. A process as claimed in claim 1, wherein the polymer is deactivated after being discharged, cooled and pelletized in the presence of the liquid.

7. A process as claimed in claim 2, wherein the polymer is deactivated after being separated from the liquid.

8. A process as claimed in claim 1, wherein the liquid has a temperature of from 20 to 95° C.

9. A process as claimed in claim 1, wherein the liquid has a temperature of from 35 to 75° C.

10. A process as claimed in claim 1, wherein the pressure is from 2 to 50 bar.

11. A process as claimed in claim 1, wherein the discharged, cooled and pelletized melt is maintained in the liquid for a residence time of from 0.1 seconds to 4 minutes.

12. A process as claimed in claim 11, wherein the residence time is from 0.55 seconds to 2 minutes.

13. A process as claimed in claim 11, wherein the residence time is from 1 to 40 seconds.

* * * * *